Patented Dec. 9, 1941

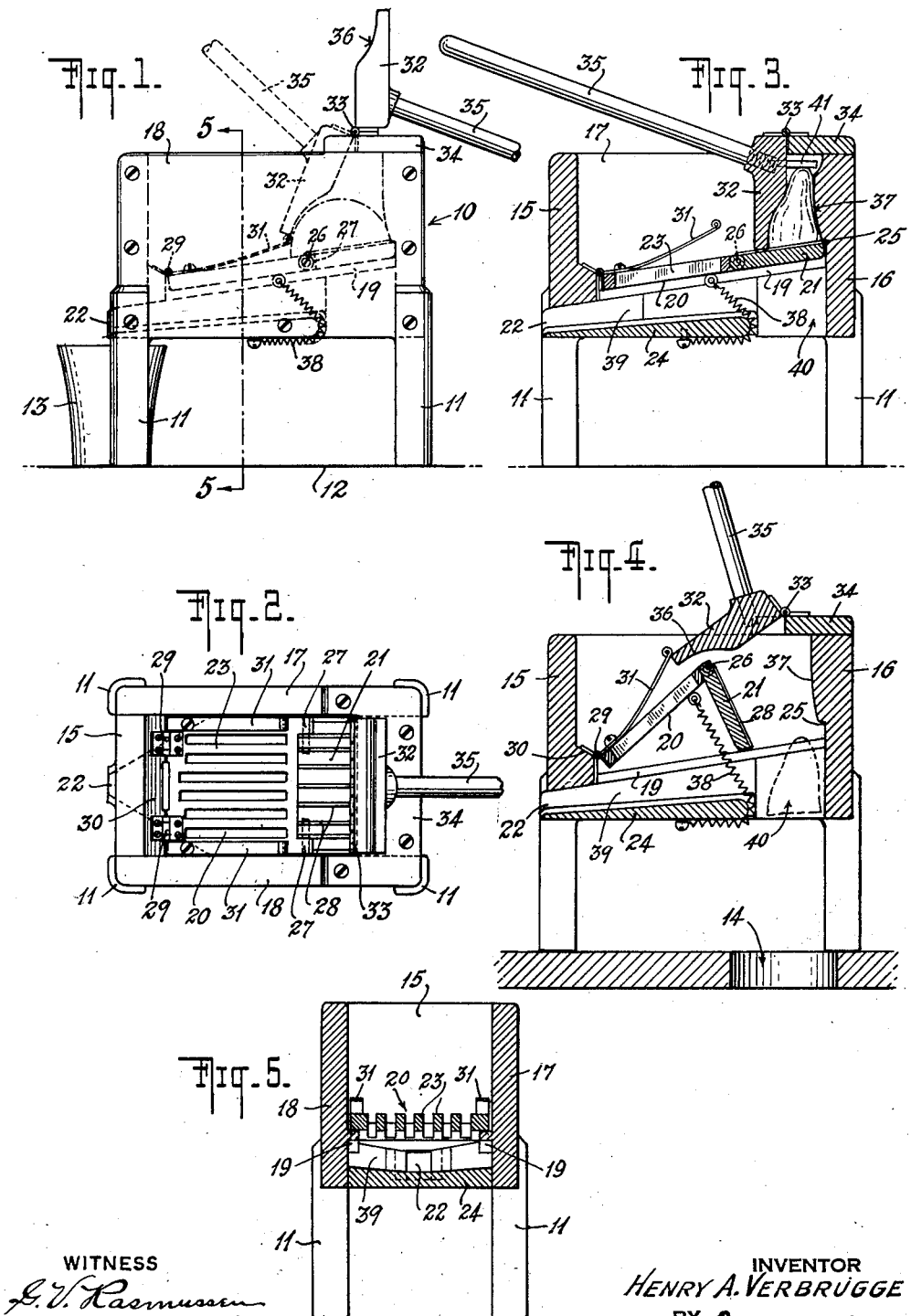

2,265,409

UNITED STATES PATENT OFFICE 2,265,409

FRUIT JUICE EXTRACTOR

Henry A. Verbrugge, New York, N. Y.

Application February 6, 1941, Serial No. 377,649

12 Claims. (Cl. 100—41)

This invention relates to a device for extracting juices from citrus fruits and its general object is to provide an improved form of fruit juice extractor which is capable of automatically ejecting the rind from the device after each squeezing operation.

With the above and other objects in view, the invention has relation to certain novel features of construction and operation, an example of which is described in the following specification and illustrated in the accompanying drawing, in which, Fig. 1 is a side elevational view of the device showing the relation of the parts at the start of a squeezing operation, the squeezer block being shown in dotted outline in the position where it is about to make engagement with the fruit; Fig. 2 is a top plan view of the device shown in Fig. 1; Fig. 3 is a vertical section taken through the device and illustrating the relation of the parts at the end of the squeezing operation; Fig. 4 is a view similar to Fig. 3 and showing the manner in which the rind is ejected from the device as the handle is returned to its starting position after the squeezing operation, and Fig. 5 is a vertical section taken along the line 5—5 of Fig. 1.

In the drawing the reference numeral 10 indicates generally the juice extractor device which may be mounted on four supporting legs 11 at a height above the table or counter surface 12 to enable a glass 13 to be placed under the discharge spout 22 of the device. The table or counter 12 preferably has an opening 14, as is indicated in Fig. 4 of the drawing, and through which the rejected fruit rinds may pass into a suitable receptacle provided beneath the counter and concealed from the view of the public.

The fruit extractor 10 includes two end walls 15 and 16 and two side walls 17 and 18, the said walls being connected together in any suitable fashion or formed of a single piece of cast metal, such as aluminum. Secured to or formed integrally with each of the side walls 17 and 18 and extending from one end wall 15 to the other end wall 16 is a rail 19, the two rails 19, 19 being disposed in substantially parallel relation and inclining towards the spout 22. Carried on the rails 19, 19, is a strainer plate 20 having a grate 23 and a fruit rind supporting plate 21 upon which the fruit is positioned during the squeezing operation. In the normal position of the plates 20 and 21, they extend in longitudinal alignment upon the inclined rails 19, 19, so that as the juice is squeezed from the fruit it flows downwardly over the supporting plate 21 and the strainer plate 20 and through the grate 23 provided in the plate 20. Disposed beneath the strainer plate 20 and secured to the side walls 17 and 18 and end wall 15 of the device, is a plate 24 having an inclined upper surface formed to receive the fruit juices passing through the grate 23 and to conduct the same to the spout 22 which is integrally formed on such plate 24. As can be seen more clearly in Figs. 3 and 4 of the drawing, the plate 24 terminates at a point approximately below the inner end of plate 21 to provide an opening 40 between such plate and the end wall 16 through which the ejected rinds may pass to the opening 14 in the table or counter. The end wall 16 is recessed at 25 so that when the strainer plate 20 and supporting plate 21 are aligned or in the position illustrated in Fig. 3 of the drawing, the adjacent edge of the supporting plate 21 will be disposed in such recess and thereby prevent any of the juice flowing through this end of the device and down through the opening which is designated generally by the numeral 40 in Figs. 3 and 4 of the drawing. The supporting plate 21 may also be provided with longitudinally extending raised portions or ribs 28 to control the flow of the juice towards the strainer plate 20.

The supporting plate 21 is pivotally secured to the adjacent end of the strainer plate 20 by means of two pins 26, 26 which extend transversely into ears or bearing supports 27 projecting from the adjacent edge of the strainer plate 20 and into spaced recesses provided on the pivoted end of the plate 21. The other end of the strainer plate 20 is pivotally connected to an abutment or offset portion 30 at the base of the end wall 15 by means of two hinges 29, 29. Mounted on the strainer plate 20 are a plurality of leaf springs 31 which extend longitudinally on each side of the plate, as can be readily seen in Fig. 3 of the drawing, the attached ends of the springs being adjacent to the hinged end of plate 20 and the free ends thereof extending upwardly away from the top surfaces of such plate to a position where they are adapted to be engaged by the free end of a squeezer block 32. The attached end of the squeezer block 32 is pivotally connected, as by means of the hinges 33, to a transverse plate or lip 34 mounted on the upper end of the end wall 16 and adjacent portions of the side walls 17 and 18. The squeezer block or plate 32 is provided with an offset handle 35 by means of which the user operates the block or plate 32 to squeeze the fruit.

It will be evident from the foregoing description that the strainer plate 20 and the supporting plate 21 normally rest upon the two spaced rails 19, 19, as is illustrated in Figs. 1 and 3 of the drawing. When half an orange is placed upon the supporting plate 21, as is illustrated in Fig. 1, and the squeezer plate 32 pivoted down by the operator actuating the handle 35, the plate 32 is brought into the dotted position illustrated in Fig. 1 of the drawing with the orange between the plate 32 and the end wall 16. During this downward movement of the squeezer plate 32, its outer end engages with the free ends of the two leaf springs 31, 31, depressing them to the position illustrated in Fig. 1 and through such engagement insuring that the plates 20 and 21 are properly positioned on the rails 19, 19 for the squeezing operation. On continued downward movement of the plate 32 the springs clear the outer end of plate 32 and spring back to their original position without disturbing the positions of the strainer plate 20 and the supporting plate 21. As a result also of this continued movement of plate 32, the orange is squeezed against the end wall 16, as is illustrated in Fig. 3 of the drawing, the juice from the orange flowing to the glass 13, in the manner hereinabove described. Preferably the under surface portion of the squeezer plate 32, indicated by the numeral 36, is concaved, while the opposing surface portion 37 of the end wall 16 which is immediately above the recess 25 in such wall, is convexly formed to facilitate and make more efficient the squeezing of the rind and to assure that the fruit will be maintained down against the supporting plate 21 during the squeezing operation. When, at the end of the squeezing operation, the squeezer plate 32 is pivoted upwardly, the outer end thereof again engages the free ends of the leaf springs 31, 31 and through such engagement lifts the strainer plate 20 upwardly about its hinges 29. As the supporting plate 21 is loosely hinged to the outer free end of the strainer plate 20, its hinged end is lifted with the free end of the strainer plate 20, while its free end rides on the rails 19, 19, as is illustrated more clearly in Fig. 4 of the drawing. As a result of this accordion-like movement of the plates 20 and 21, there is left an opening 40 through which the squeezed rind may drop, the discharged rind falling through the opening 14 provided in the table or counter and into a pail or other receptacle. As soon as the outer end of the squeezer plate 32 disengages from the free ends of the leaf springs 31, 31 as it continues its upward movement, plates 20 and 21 by their own weight drop back to their normal positions on the two rails 19, 19, plate 20 pivoting about its hinges 29, 29 and plate 21 pivoting about the free end of plate 20, the free end of the supporting plate 21 sliding along the rails 19, 19 during this movement until it again enters the recess 25 in the end wall 16. Preferably, however, this return movement of the two plates 20 and 21 is made positive and almost instantaneous by means of a spring 38 which may be attached at one end to the under side of the plate 24 and at its other end to the under surface of the strainer plate 20, as is shown in Figs. 1, 3 and 4 of the drawing. By this construction the two plates 20 and 21 will immediately snap back to their normal positions on the rails 19, 19 after the free end of the squeezer plate 32 has become released from its engagement with the leaf springs 31, 31 in its upward movement, thereby immediately restoring such plates to a position where the next half of the fruit can be squeezed. The under or inclined plate 24 is also preferably formed or channeled so that the juice falling thereupon through the grate 23 will be guided in the most efficient manner to the spout 22, see for example, the form shown in Figs. 2 and 5 of the drawing.

This invention, therefore, provides a fruit juice extractor which is capable of automatically ejecting the rind from the device as the squeezer plate 32 is lifted after each squeezing operation, the arrangement and construction of the supporting and strainer plates 21, 20, respectively, being such that these plates immediately return to proper position for the next squeezing operation, thereby enabling a continuous squeezing of a large number of fruit in a most efficient manner. The discarded rinds fall out of sight from the view of the buyer, thereby maintaining the counter neat and clean.

While I have illustrated in the drawing and hereinabove described a preferred embodiment of my invention, it is to be understood that changes and modifications in such construction can be made without departing from the spirit of the invention or the scope of the appended claims. For example, the squeezer plate 32 may be provided on its under surface with a projecting portion 41 or otherwise formed so that on the upward pivoted movement of such plate, the projecting member 41 or other portion thereof, will engage the top of the squeezed rind and dislodge it from the end wall 16 or start it on its downward movement as the plate 21 is being withdrawn, thereby preventing any possibility of the squeezed rind sticking to the plate 32 or the end wall 16. The legs of the device may, of course, be replaced by a closed wall or entirely removed so that the opening 40 is positioned immediately above the hole 14, in which case a recess should be provided in the counter for the reception of the glass 13.

I claim:

1. A fruit juice extractor comprising a plate having a position of rest and adapted to support a fruit rind to be squeezed, means slidably and pivotally supporting said plate, a movable squeezer plate associated with said fruit rind supporting plate, and means connected to said fruit rind supporting plate and coacting with said squeezer plate on the return movement of the latter to move said fruit rind supporting plate with a sliding pivotal movement out of its at rest position and thereby permit the squeezed rind to drop out of the extractor.

2. A fruit juice extractor such as is defined in claim 1, in which said squeezer plate and the means coacting therewith to move the supporting plate, are pivoted to move about spaced fulcrums and cease their coactive relationship before the end of the return movement of said squeezer plate, thereby enabling said supporting plate to return to its at rest position ready to receive another rind by the time the squeezer plate has completed its return movement.

3. A fruit juice extractor such as is defined in claim 1, including means to return said supporting plate to its at rest position with a snap action when the fruit rind has been discharged.

4. A fruit juice extractor comprising a pair of spaced rails, a fruit rind supporting plate resting on said rails and having a position of rest, a member pivotally connected at one end to said plate and at its other end to a fixed surface, whereby said plate is enabled to be moved with a sliding pivoted movement relative to said rails, a movable squeezer plate associated with said supporting plate, and means connected to said member and adapted to coact with said squeezer plate when the latter is moving in one direction to cause said supporting plate to move out of its at rest position with a pivotal sliding movement.

5. A fruit juice extractor comprising a pair of spaced inclined rails, a fruit rind supporting plate and a strainer plate resting on said rails, means pivotally connecting one end of said strainer plate to an end of said supporting plate, means pivotally connecting the other end of said strainer plate to a fixed surface, a movable squeezer plate associated with said supporting plate, and spring means mounted on said strainer plate and adapted to coact with said squeezer plate when the latter is moving in one direction to lift said strainer plate about its fixed hinge and thereby to cause said supporting plate to move with a pivotal sliding movement relative to said rails.

6. A fruit juice extractor such as is defined in claim 5, including a fixed wall positioned adjacent to the free end of said supporting plate and having a recess in which the free end of said supporting plate is positioned in its at rest position.

7. A fruit juice extractor such as is defined in claim 5, in which said spring means includes a pair of leaf springs having their free ends extending into the path of movement of said squeezer plate.

8. A fruit juice extractor such as is defined in claim 5, including means positioned below said strainer plate for conducting juice flowing through the latter to a point of discharge.

9. A fruit juice extractor such as defined in claim 5, including an inclined plate positioned below the strainer plate and extending from the fixed hinge of said plate to a point approximately below the hinged end of said supporting plate, said inclined plate being adapted to conduct the juice flowing through said strainer plate to a point of discharge.

10. A fruit juice extractor such as is defined in claim 5, in which said squeezer plate is provided with means on one surface adapted to engage a fruit rind and dislodge it when said squeezer plate is moving in the direction for actuating said supporting plate.

11. A fruit juice extractor such as defined in claim 5, including a fixed wall positioned adjacent to the free end of said supporting plate, a portion of said wall and the opposing surface portion of said squeezer plate being arcuately formed and adapted to maintain a fruit rind on said supporting plate during the squeezing operation.

12. A fruit juice extractor such as defined in claim 5, including means positioned below said strainer plate for conducting juice flowing through the latter to a point of discharge, and spring means connected to said juice conducting means and said strainer plate and adapted to return said strainer and supporting plates to their at rest positions after being lifted by said squeezer plate.

HENRY A. VERBRUGGE.